United States Patent [19]
Palma

[11] 3,875,061

[45] *Apr. 1, 1975

[54] CENTRIFUGAL SEPARATOR WITH FIELD EFFECT SEPARATION

[76] Inventor: James R. Palma, 1502 Curry Rd., Schenectady, N.Y. 12306

[*] Notice: The portion of the term of this patent subsequent to Dec. 19, 1989, has been disclaimed.

[22] Filed: Aug. 27, 1973

[21] Appl. No.: 392,088

[52] U.S. Cl.............. 210/223, 209/223, 210/243, 210/374, 210/512
[51] Int. Cl...................... B01d 35/06, B01d 33/02
[58] Field of Search ........... 210/222, 223, 243, 512, 210/304, 374; 209/223, 232, 39, 40

[56] References Cited
UNITED STATES PATENTS

| | | | |
|---|---|---|---|
| 454,555 | 6/1891 | Atkins | 209/223 R |
| 1,334,962 | 3/1920 | Niece et al. | 210/222 X |
| 2,522,556 | 9/1950 | Wuensch | 210/223 X |
| 2,771,995 | 11/1956 | Noel | 210/222 |
| 3,024,392 | 3/1962 | Baermann | 210/222 UX |
| 3,124,725 | 3/1964 | Lequillan | 210/222 UX |
| 3,478,494 | 11/1969 | Lustenader et al. | 210/243 X |
| 3,528,552 | 9/1970 | Martin | 210/223 |
| 3,669,274 | 6/1972 | Happ et al. | 210/222 |
| 3,706,383 | 12/1972 | Palma | 210/512 X |
| 3,768,658 | 10/1973 | Palma | 210/304 |

Primary Examiner—Theodore A. Granger
Attorney, Agent, or Firm—Oltman and Flynn

[57] ABSTRACT

A centrifugal fluid separator having a magnetic or electrostatic field for attacting particles discharged centrifugally through openings in a rotatable spiral conduit, which has interior transverse abutments at or near those openings.

9 Claims, 7 Drawing Figures

PATENTED APR 1 1975  3,875,061

CENTRIFUGAL SEPARATOR WITH FIELD EFFECT SEPARATION

BACKGROUND OF THE INVENTION

In U.S. Pat. No. 3,706,383, I have disclosed and claimed a fluid separator with a rotatable spiral conduit inside a housing. The spiral conduit has interior transverse abutments positioned in the path of fluid flow through the conduit and openings near these abutments for the escape of heavier constituents of the fluid stream flowing through the rotating spiral conduit.

In my co-pending U.S. Pat. application, Ser. No. 312,041 now U.S. Pat. No. 3,768,658, filed Dec. 4, 1972, and entitled "Separator", I have disclosed and claimed a modified arrangement having an internal cylindrical wall which extends between and joins successive turns of the rotatable spiral conduit so that three fluid passageways are provided: the interior of the spiral conduit itself; the space inside the internal cylindrical wall (at the inside of the spiral turns of the conduit); and the annular space between this internal wall and the outer housing (at the outside of the spiral turns of the conduit). The spiral conduit has interior abutments and nearby openings at the outside or the inside, or both, of its turns to enable the separation of fluid constituents introduced into the spiral conduit, and/or into the annular space outside its turns, and/or into the generally cylindrical space inside its turns.

In my co-pending U.S. Pat. application, Ser. No. 375,623, filed July 2, 1973, and entitled "Fluid Separator or Mixer", I have disclosed and claimed a modified separator or mixer in which the discharge openings in the rotating spiral conduit are formed directly in the transverse internal abutments themselves. The conduit can be heated and/or cooled.

SUMMARY OF THE INVENTION

The present invention is directed to a fluid separator of the same general type as the aforementioned patent and patent applications and which is improved by provision for separating and collecting particles in the fluid stream which are readily attractable by a force field, such as a magnetic field or an electrostatic field.

Accordingly, it is an object of this invention to provide a novel and improved centrifugal fluid separator having provision for separating and collecting particles in the fluid that are attractable by a force field, particularly magnetizable particles or electrostatically attractable particles.

Further objects and advantages of this invention will be apparent from the following detailed description of certain presently-preferred embodiments thereof, which are illustrated schematically in the accompanying drawing, in which.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation. The term "fluid", as used herein, embraces a gas or a liquid or a particulate solid that is capable of flowing freely.

Figure 1:
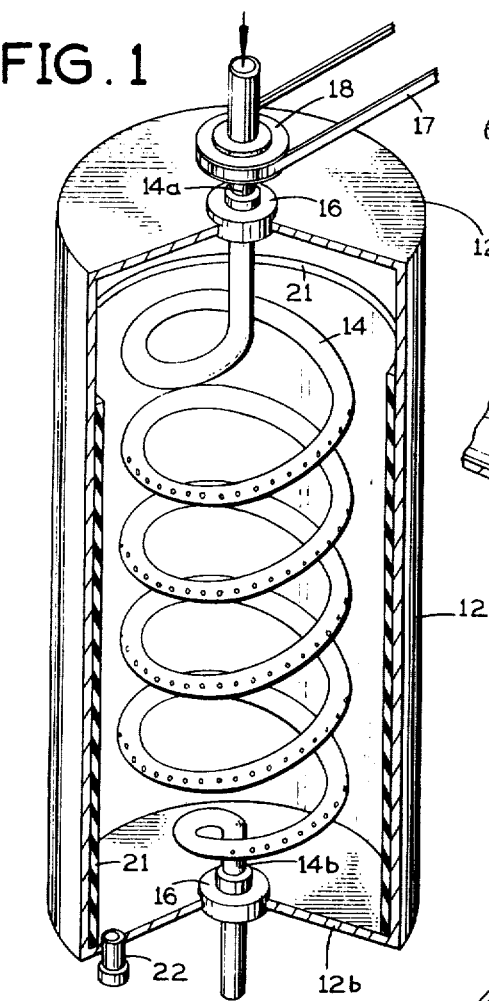
FIG. 1 is a vertical section through a first embodiment of the present invention, having a liner of magnetic "rubber" or the like for attracting magnetizable particles in the fluid stream whose constituents are being separated.

Referring first to FIG. 1, the illustrated embodiment of the present apparatus comprises an outer housing 12, which preferably is cylindrical, and a spiral conduit 14 that is rotatable about a vertical axis extending centrally inside this housing. This conduit preferably is cylindrical in cross-section and of uniform cross-sectional diameter along its length. The turns of the conduit preferably are of the same size (radially) and are evenly spaced apart (axially). However, the spiral turns may be non-uniform in diameter and unequally spaced apart, if desired.

The spiral conduit has an offset, centrally located, vertical upper end 14a which is rotatably received in a bearing 16 in the horizontally disposed top wall 12a of the outer housing. Similarly, the spiral conduit has an offset, centrally located, vertical lower end 14b which is rotatably received in a similar bearing 16 in the horizontal bottom wall 12b of the outer housing. The spiral conduit 10 is driven from a motor (not shown) through a belt 17 and a pulley 18 attached to its upper end above the housing 12.

The fluent material to be separated preferably is supplied directly to the upper end of the spiral conduit, as indicated by the arrow above the pulley 18 in FIG. 1. The spiral conduit is open at its offset lower end 14b below the bottom wall 12b of the housing.

Figure 2:
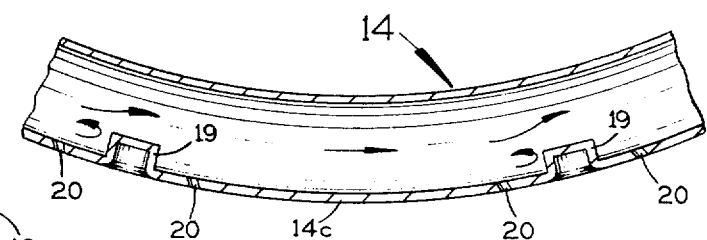
FIG. 2 is an enlarged section taken longitudinally along the rotatable spiral conduit in the FIG. 1 apparatus.

As shown in FIG. 2, the spiral conduit 14 has internal abutments 19, which project transversely inward into its interior from its outer circumferential wall 14c, and inclined openings 20 on either side of each abutment, substantially as disclosed in my aforementioned U.S. Pat. No. 3,706,383.

Figure 2A:
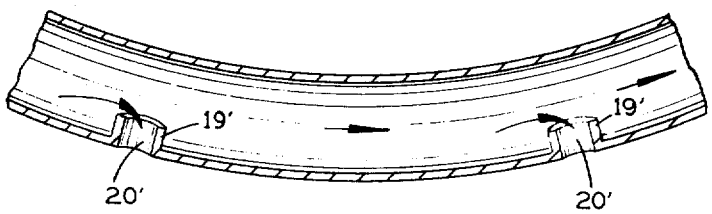
FIG. 2a is a view similar to FIG. 2 and showing a modified arrangement of the internal transverse abutments and openings in the rotating spiral conduit.

Alternatively, as shown in FIG. 2a, radial openings 20' may be formed in the internal abutments 19' themselves, as disclosed in my aforementioned co-pending U.S. Pat. application, Ser. No. 375,623.

In either case, the internal abutments and the associated openings cooperatively act on the stream of fluent material flowing down along the inside of the rotating spiral conduit 14 to cause the heavier constituents to pass out centrifugally through these openings into the interior of the housing 12 outside the rotating spiral conduit.

In some cases, these heavier constituents may include particles which are readily attractable by a force field, such as a magnetic field or an electrostatic field, and which it may be desirable to separate from other heavier constituents that may escape from the interior of the rotating spiral conduit 14 through its openings 20 or 20'.

Figure 3:
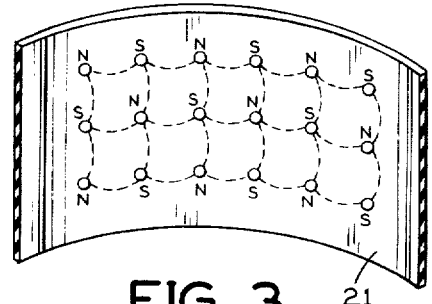
FIG. 3 is a fragmentary plan view showing part of the magnetic rubber liner in the FIG. 1 apparatus, with the magnet poles and the magnetic field between them depicted schematically.

In accordance with a first embodiment of the present apparatus, where the particles are readily attracted magnetically, the outer housing 12 is provided on the inside with a magnetic liner in the form of a sheet 21 of magnetic rubber. This magnetic rubber comprises particles of barium ferrite or other suitable permanently magnetizable material that is embedded in a suitable solidified binder of rubber-like or plastic material with appropriate dielectric properties. As shown schematically in FIG. 3, the permanent magnet particles in the sheet 21 are polarized to provide alternate "North" and "South" poles in succession, both circumferentially and vertically. These opposite polarity permanent magnet poles produce magnetic fields between them at the inside of the housing 12 for attracting magnetizable particles that are discharged centrifugally through the openings 20 or 20' in the rotating spiral conduit 14.

The remaining, non-magnetic heavier constituents that are discharged centrifugally by the rotating spiral conduit 14 may be withdrawn from the interior of the housing 12 through a fitting 22 in its bottom wall 12b.

Figure 4:
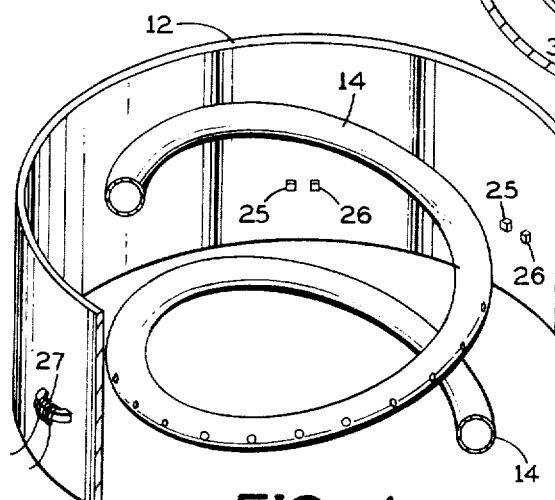
FIG. 4 is a fragmentary perspective view showing a modified apparatus provided with electromagnets.

Referring to FIG. 4, an essentially similar magnetic separation may be achieved in a generally similar apparatus in which the magnetic rubber sheet 21 is replaced by electromagnets having their opposite polarity pole tips 25 and 26 exposed at the inside of the housing 12, and each having an energizing winding 27 at the outside that may be connected to any suitable A.C. or pulse source. For clarity FIG. 4 shows only a few such electromagnets, and the spacing between them is greatly exaggerated to simplify the drawing. However, it is to be understood that in actual practice a relatively large number of closely spaced electromagnets may be provided to separate the magnetic particles from the non-magnetic heavier constituents that are discharged centrifugally through the openings in the rotating spiral conduit 14.

Figure 5:
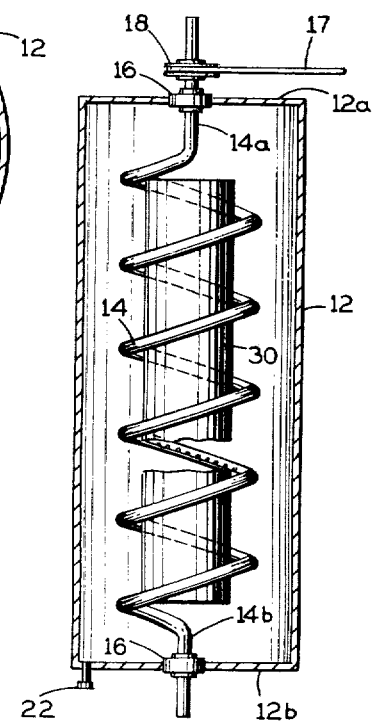
FIG. 5 is a vertical section of another embodiment having an elongated bar magnet inside the rotating spiral conduit.

FIG. 5 shows yet another magnetic embodiment of the present invention, which has an elongated bar magnet 30 extending lengthwise inside the spiral conduit 14 along its rotational axis. The opposite polarity pole tips at the upper and lower ends, respectively, of this bar magnet produce a magnetic field inside the housing 12 for attracting the magnetic particles discharged centrifugally through the openings in the rotating spiral conduit 14 and for separating these magnetic particles from the non-magnetic constituents that are also discharged centrifugally from the spiral conduit.

Figure 6:
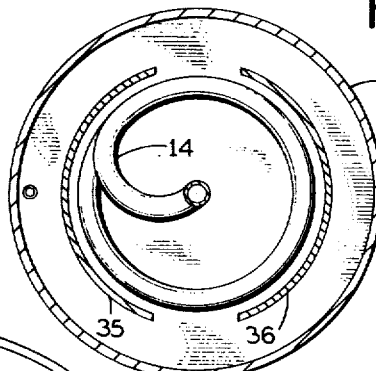
FIG. 6 is a horizontal cross-section through yet another embodiment in which the particles are attracted electrostatically.

In the embodiment of the present apparatus shown in FIG. 6 the force field for attracting particles is an electrostatic field produced by a pair of convex plates 35 and 36 facing each other and extending closely around opposite circumferential portions of the rotation spiral conduit 14. The plates 35, 36 are connected across a suitable voltage source, which creates an electrostatic field between them inside the housing 12 for attracting particles that are discharged centrifugally through the openings in the rotating spiral conduit. If desired, these plates may be perforated or they may be screen-like structures capable of readily passing through their openings or interstices the centrifugally discharged constituents which are not electrostatically attractable.

I claim:

1. In a fluid separator for separating contaminants from a moving fluid, said separator including in combination, a housing, a spirally shaped conduit extending through said housing having a plurality of helical coils in said housing and having external portions available outside said housing providing an inlet and an outlet so that fluid containing contaminants may be supplied into said inlet through said coils and out said outlet, said conduit having a plurality of openings therethrough each communicating from the interior of said conduit to an area outside said conduit within said housing, said openins being spaced lengthwise along the length of said conduit and providing paths through which contaminants can escape from the fluid in said conduit, an abutment projection cooperating with each of said openings and aligned with the fluid flow path past said openings, each said abutment projecting inwardly of said conduit to cause fluid flowing through said conduit to swirl in an eddy current in one direction at a leading edge of the respective abutment and to swirl in an eddy current in the opposite direction at a trailing edge of the respective abutment and means drivingly connected to said conduit to continuously rotate the coiled portion of said conduit within said housing to create centrifugal forces which eject contaminants from the swirling eddy currents through the openings, the improvement which comprises:

means for producing, inside said housing and outside said spirally shaped conduit between said inlet and outlet, an electrical force field which is effective to attract field sensitive particles in the contaminants passing out of the conduit through said openings therein.

2. A separator according to claim 1, wherein said means for producing a force field produces a magnetic field.

3. A separator according to claim 2, wherein said means for producing a magnetic field comprises permanent magnet means.

4. A separator according to claim 2, wherein said means for producing a magnetic field comprises electromagnet means.

5. A separator according to claim 2, wherein said means for producing a magnetic field comprises means providing a plurality of magnet pole tips of alternate magnetic polarity in succession around the inside circumference of said housing.

6. A separator according to claim 5, wherein said last mentioned means comprises a pluality of permanent magnets having permanently magnetizable particles embedded in a dielectric binder of rubber-like or plastic material.

7. A separator according to claim 5, wherein said last mentioned means comprises a plurality of electromagnets with their pole tips at the inside of said housing.

8. A separator according to claim 3, wherein said permanent magnet means comprises a bar magnet extending along the inside of the turns of said coiled conduit.

9. A separator according to claim 1, wherein said means for producing a force field produces an electrostatic field.

* * * * *